March 8, 1927.
M. LOUGHEAD
HOSE FITTING
Filed Jan. 23, 1922
1,620,114
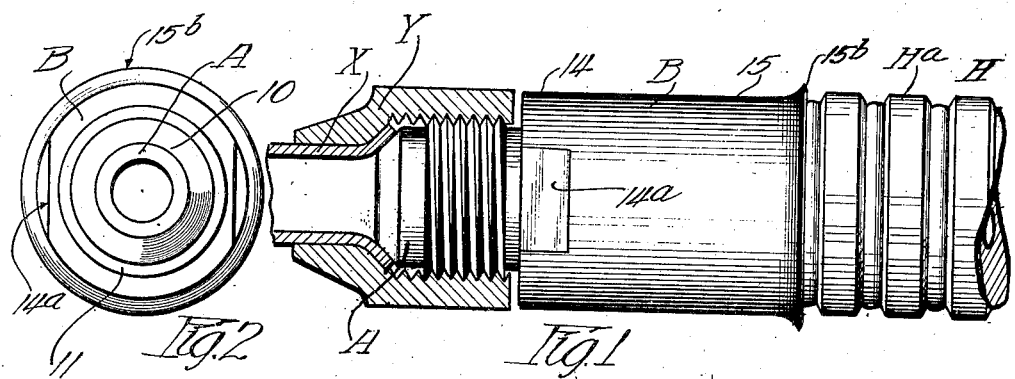
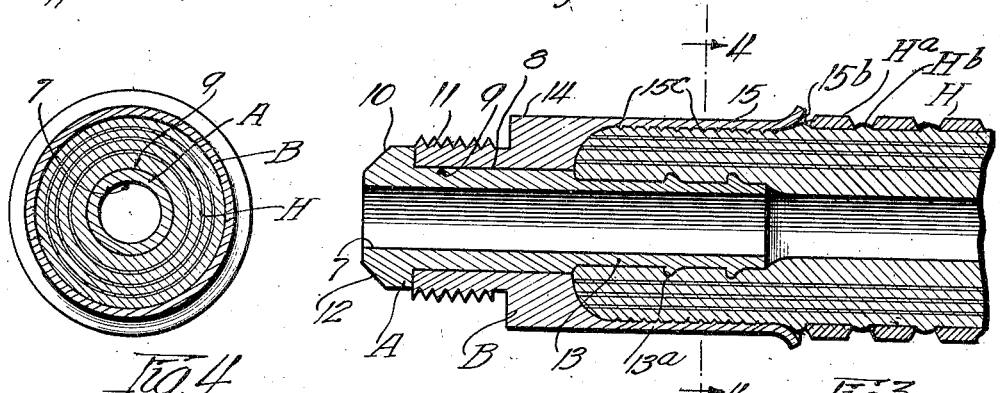
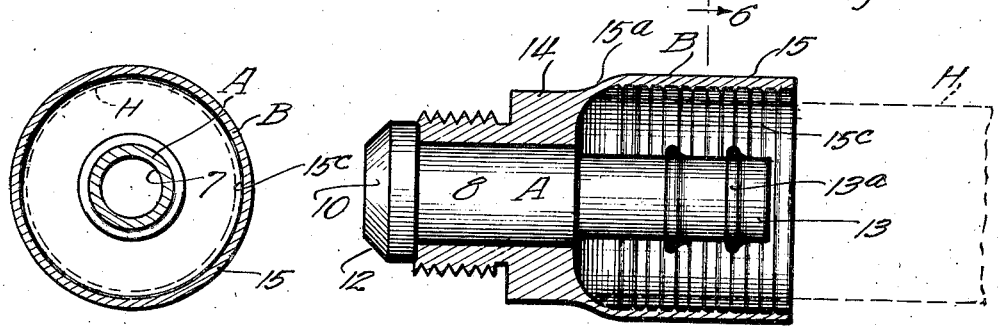

Patented Mar. 8, 1927.

1,620,114

UNITED STATES PATENT OFFICE.

MALCOLM LOUGHEAD, OF DETROIT, MICHIGAN, ASSIGNOR, BY MESNE ASSIGNMENTS, TO HYDRAULIC BRAKE COMPANY, OF LOS ANGELES, CALIFORNIA, A CORPORATION OF CALIFORNIA.

HOSE FITTING.

Application filed January 23, 1922. Serial No. 531,141.

My invention relates to a reinforced hose fitting. The object of the invention is the provision of a reinforced hose fitting that is comparatively cheap to manufacture, and simple and durable in construction, but which is nevertheless so constructed that the fitting may be easily applied to a hose and be caused securely to engage the latter with a fluid tight fit.

The fitting illustrated in the accompanying drawings is a hose coupling device, but I appreciate that the salient features of my invention are applicable to various other hose fittings, such as hose nozzles, hose end plugs, etc. The reinforced hose disclosed may be employed wherever a hose of great strength is desired, but is particularly designed for use in the pipe lines of fluid operated braking systems.

Since my invention will best be understood from a description read in connection with an illustrative drawing, I shall proceed at once to a description of the accompanying drawing, in which—

Figure 1 is a side elevational view illustrating a hose coupling member embodying my invention as it appears when fitted upon a section of hose, portions of a co-operating coupling member being illustrated in section in this view;

Figure 2 is an end view of the coupling member dissociated from the parts shown in section in Figure 1;

Figure 3 is an axial sectional view of the hose and coupling member;

Figure 4 is a transverse section taken on line 4—4 of Figure 3;

Figure 5 is an axial sectional view of the coupling member as it appears prior to application to the hose, one of the elements of the coupling member being illustrated in elevation, the other element being illustrated in axial section, and Figure 6 is a transverse section taken on line 6—6 of Figure 5.

Similar characters of reference refer to similar parts throughout the several views.

Referring first to Figure 6, it will be noted that the coupling member comprises an inner element A and an outer element B. Element A is provided with a bore 7, and has an outer cylindrical surface 8, which fits snugly in the bore 9 of the outer element B. Element A is furthermore provided at its outer end with a flange or shoulder 10, which fits snugly against the adjacent end of the externally threaded boss 11 of element B, shoulder 10 preferably being provided with an annular bevel 12. It will be understood that the threads of boss 9 are adapted to be engaged by an outer collar for the purpose of drawing beveled surface 12 tightly in engagement with a correspondingly shaped seat in a coupling member which mates the one herein illustrated and described in detail. The mating coupling member and its associated nut are illustrated at X and Y respectively. That end of element A remote from flange or shoulder 10 is preferably reduced in diameter to provide a nipple 13, which may be inserted into the hose to which the coupling member is to be attached. Nipple 13 is provided with external flanges or annular ridges 13ª—13ª, which need not differ essentially from the ridges found upon ordinary hose fittings.

Element B similarly to element A is formed in one piece, and in addition to boss 11 comprises the body portion 14 and the comparatively thin sleeve 15. It will be noted that the sleeve 15 originally curves outwardly away from the body portion, as indicated at 15ª. Sleeve 15 is provided on its inner surface with a plurality of inwardly extending ridges 15ᶜ. Prior to the application of the coupling to the hose, the inner diameter of the sleeve is slightly greater than the outer diameter of the hose. The hose is indicated at H, being illustrated in dotted lines in Figures 5 and 6, and in full lines in Figures 1, 3 and 4.

Before applying the fitting or coupling member to a hose, the element A is placed in element B, as illustrated in Figure 5. The hose H is now slipped into sleeve 15, and around the ridged nipple 12. Sleeve 15 is now subjected to a diameter reducing operation, which eliminates the curve 15ª, and causes the outer cylindrical surface of the sleeve to lie flush with the curved surfaces of body portion 14. The reduction in the diameter of the sleeve may be accomplished by means of a reducing die or by a spinning operation. If preferred, the body portion 14 may be provided with oppositely located plane surfaces 14ª—14ª, which permit element B to be grasped by a suitable tool. The reduction of the outer diameter of sleeve 15 results in a corresponding reduction of its inner diameter, and increases its length somewhat. I prefer to so perform the diameter reducing operation as to leave the sleeve with a "belled" or outwardly flaring edge 15ᵇ. This "belled" or outwardly flaring edge, together with the fact that the nipple 13 terminates a short distance within the sleeve 15, permits the hose to articulate relatively to the fitting, within certain limits, without injury to the hose. Terminating the nipple 13 some distance within the sleeve 15 prevents the hose being cut by the end of the nipple.

That portion of the hose which lies between nipple 12 and sleeve 15 is very considerably compressed when the diameter of the sleeve is reduced in the manner hereinbefore explained. This compression of the hose causes the same snugly and tightly to engage the sleeve and the nipple, and results in the ridges 13ᵃ and 15ᶜ becoming embedded in the inner and outer surfaces of the hose, respectively. This arrangement provides a fluid-tight connection, and also enables the hose to withstand longitudinal stresses tending to pull it off of the nipple.

A particular advantage is afforded by the fact that the elements A and B are mechanically connected together. In the present instance, this mechanical connection is afforded by the elements X and Y. Any other equivalent form of mechanical connection may be employed. In fact, I contemplate that in some cases it may be desirable to form the elements A and B from a single piece of metal. Since both the nipple 12 and sleeve 15 are in frictional contact with the hose, it will be seen that each of these parts tends to prevent dislodgment of the other.

Element A may, of course, be formed of any suitable material, but is preferably formed of metal. Element B is formed of any metal, such as brass, which can successfully be subjected to the diameter reducing operation hereinbefore described. I prefer to form the fitting of my invention in two parts, but appreciate that the elements A and B could be formed in one piece if desired.

In practice, it is sometimes found difficult to devise a hose which will withstand the great pressures to which the fluids therein are subjected, as in the supply pipes of a fluid operated brake system for an automobile. The proper operation of fluid operated brake systems is dependent on the maintenance in the system of a predetermined volume of fluid and the provision of means whereby the brakes will be properly applied as the result of a predetermined movement of the fluid displacing means or operating plunger. Due to these requirements of the commercially satisfactory system, expansion of any of the members containing the fluid would result in an unsatisfactory operation of the brakes. For example, if the pressure required to satisfactorily operate the brakes is 500 pounds per square inch and the conveying hose or tube is of such a character that material expansion therein will be caused by a pressure of less than 500 pounds per square inch, the pressure created in the system will tend to expand the fluid conveying tube or hose, and thus fail to produce in the system the 500 pounds pressure which is required to properly operate the brakes. Thus, a fluid conveying tube or hose employed in a fluid operated braking system must be of such a character as to be practically non-expansive when subjected to internal pressures such as required to operate the brakes. To avoid any possibility of the hose being ruptured, due to these excessive pressures, and particularly to prevent the expansion of the hose when subjected to these pressures applicant has provided a new and unique reinforcing arrangement consisting of the rings Hᵃ—Hᵃ about the outer surface of the hose H. These rings Hᵃ are formed of any suitable metal, such as brass, which may be compressed to a less size. The rings Hᵃ are originally of such a size as to permit them to be slipped onto the hose H. The rings are then suitably spaced on the hose by any suitable means, and are next reduced in diameter by means of a reducing die, or any other suitable device. The rings Hᵃ, after being reduced in diameter, have an inner diameter slightly less than the normal outer diameter of the hose, and will firmly engage the hose. The outer surface of the hose will now be slightly bulged between the rings to form the ridges Hᵇ. Thus, the reinforcing rings are individually secured firmly to the hose. This provides a structure in which the repeated bending of the hose does not cause the reinforcing devices to wear each other or the hose, and in which there is no tendency for the reinforcing means to spread and cause a weak spot in the hose. It is also evident that applicant's reinforcing means does not materially affect the flexibility of the hose unless the reinforcing rings are made wide, or are positioned very close together. It is, of course, evident that the width of the rings and the distance between them on the hose may be varied according to the demands of the use to which the hose is to be put. The reinforced hose herein disclosed is particularly adapted for use with applicant's fitting, as it has no loose ends of wire or other devices on the outside of the hose which must be secured within or to the fitting.

Having thus described my invention, what I claim as new and desire to secure by Letters Patent of the United States is:

1. In combination a hose, and a plurality of spaced apart metallic rings having inner surfaces of greater width than their outer surfaces, encircling said hose and compressed thereupon, whereby the diverging sides of the rings cause the surface of said hose between adjacent rings to be distorted to hold the ring permanently in position thereupon.

2. In combination a hose of flexible material, and a plurality of spaced apart metallic rings having side edges divergent in a direction toward the centers of said rings, encircling said hose and compressed thereupon, whereby the divergent edges thereof are imbedded in the outer surface of said hose to produce ridges therein between adjacent rings and hold said rings permanently in position.

3. In combination a hose of flexible material, and a plurality of spaced apart metallic rings encircling said hose and tightly compressed upon the hose, whereby to cause the surface of the hose between adjacent rings to be distorted and hold the rings permanently in position thereon.

4. In combination a flexible hose, a connecting member for the end of said hose having a sleeve encompassing the end portion of the hose and having its adjacent end flared outwardly away from the hose and a ring of unyielding material compressed about said hose adjacent to the flared end portion of said sleeve to prevent the expansion and contact of said hose with the end of said sleeve upon the flexing of said hose.

5. In combination a flexible hose having an exterior rubber surface, a connecting member for the end of said hose having a sleeve contracted onto the surface of the hose sufficiently to cause an extrusion of the surface of the hose beyond the end of the sleeve, the end of the sleeve being flared outwardly to present a curved surface to the extruded rubber, and metallic reinforcing means for the hose adjacent the end of the sleeve to prevent the expansion of the hose into contact with the edges of said sleeve.

In witness whereof, I hereunto subscribe my name this 9th day of January, 1922.

MALCOLM LOUGHEAD.